US011109248B2

(12) United States Patent
Lindner et al.

(10) Patent No.: US 11,109,248 B2
(45) Date of Patent: Aug. 31, 2021

(54) SYSTEM FOR MONITORING, CONTROLLING, ANALYZING PERFORMANCE AND/OR TRACING MALFUNCTIONS IN WLANS

(71) Applicant: GHMT AG, Bexbach (DE)

(72) Inventors: Frank Lindner, Herchweiler (DE); Viachaslau Shyfryn, Neunkirchen (DE); Sascha Heissler, Ottweiler (DE); Dirk Wilhelm, Bruchmühlbach-Miesau (DE)

( * ) Notice: Subject to any disclaimer, the term of this patent is extended or adjusted under 35 U.S.C. 154(b) by 489 days.

(21) Appl. No.: 16/074,376

(22) PCT Filed: Feb. 20, 2017

(86) PCT No.: PCT/EP2017/053746
§ 371 (c)(1),
(2) Date: Jul. 31, 2018

(87) PCT Pub. No.: WO2017/144397
PCT Pub. Date: Aug. 31, 2017

(65) Prior Publication Data
US 2021/0195445 A1 Jun. 24, 2021

(30) Foreign Application Priority Data

Feb. 26, 2016 (DE) ..................... 10 2016 103 435.5
Feb. 9, 2017 (DE) ..................... 10 2017 102 627.4

(51) Int. Cl.
*H04W 24/06* (2009.01)
*H04W 24/04* (2009.01)
*H04W 84/12* (2009.01)

(52) U.S. Cl.
CPC ........... *H04W 24/06* (2013.01); *H04W 24/04* (2013.01); *H04W 84/12* (2013.01)

(58) Field of Classification Search
CPC . H04L 41/5009; H04L 41/22; H04L 41/0253; H04L 43/045; H04L 41/0213; H04L 41/32; H04W 16/04; H04W 16/10
See application file for complete search history.

(56) References Cited

U.S. PATENT DOCUMENTS 5,809,395 A * 9/1998 Hamilton-Piercy ........................
H04W 88/085
370/489
5,933,420 A 8/1999 Jaszewski et al. ............ 370/329
(Continued)

FOREIGN PATENT DOCUMENTS

DE 4303999 A1 8/1994
DE 102006044462 B4 2/2010
(Continued)

OTHER PUBLICATIONS

The Notification Concerning Transmittal of International Preliminary Report on Patentability (Chapter I of the Patent Cooperation Treaty), in English, dated Sep. 7, 2018, which was issued by the International Bureau of WIPO in Applicant's corresponding international PCT application having Serial No. PCT/EP2017/053746, filed on Feb. 20, 2017.

(Continued)

*Primary Examiner* — Syed Ali
(74) *Attorney, Agent, or Firm* — Bodner & O'Rourke, LLP; Gerald T. Bodner; Christian P. Bodner

(57) ABSTRACT

A system for monitoring, controlling, analyzing performance and/or tracing malfunctions in standard radio networks using the recording of the data exchange of a minimum number of channels available in each radio network, wherein at least the channel utilization and/or the number and/or the duration of channel changes and/or the number of clients and/or the number of packet retransmissions and/or the categorization of the traffic (management, data) is ana-
(Continued)

Figure 1:
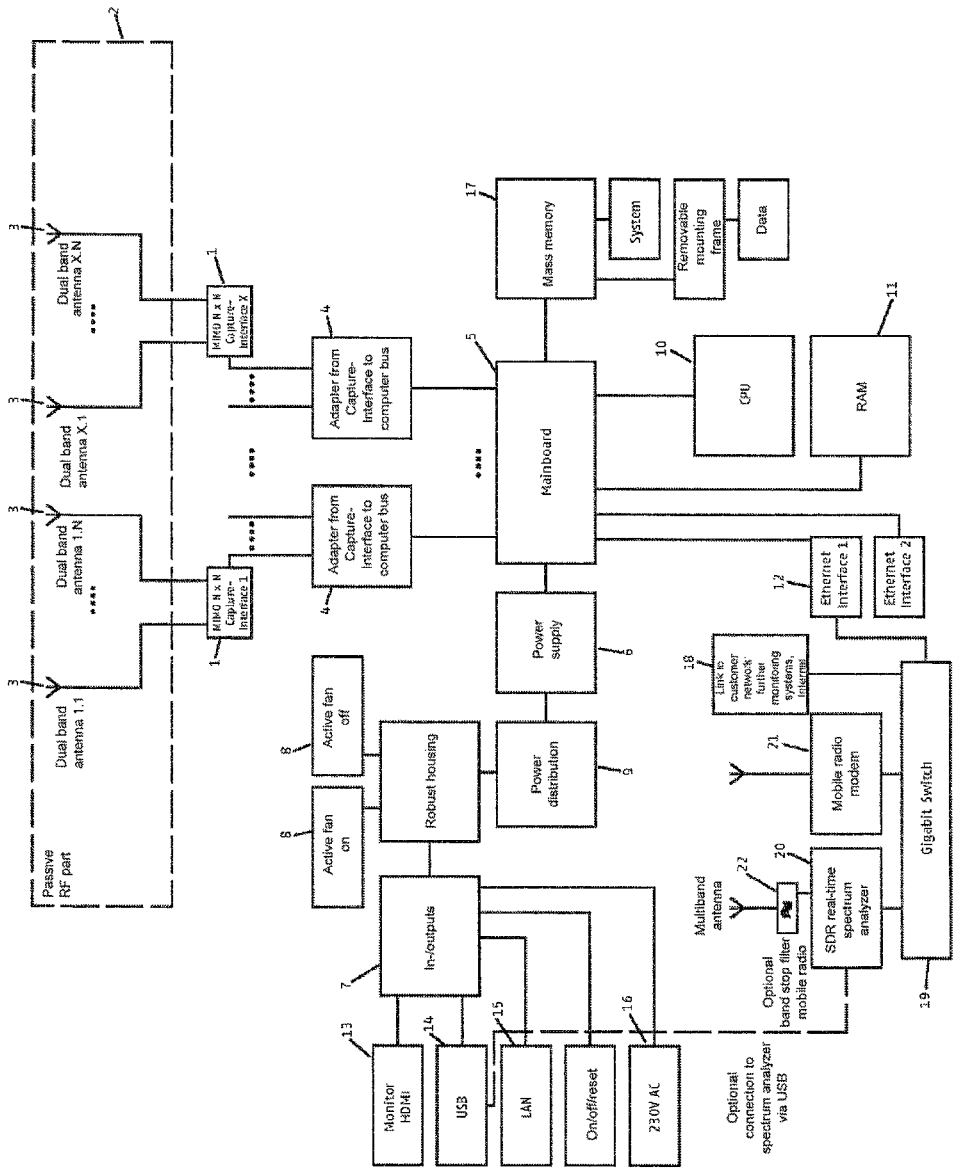

lyzed relative to the data exchange, is formed as a mobile, portable unit having a number of radio-frequency receivers covering all available radio channels or the channels identified by the system as relevant. The unit also comprises at least one adapter which prepares the data or data packets recorded by the RF-receivers and transfers them in the form of traffic data to a mass memory of an integrated computer or processor.

9 Claims, 3 Drawing Sheets

(56) References Cited

U.S. PATENT DOCUMENTS

| | | | | |
|---|---|---|---|---|
| 6,977,912 | B1 | 12/2005 | Porter et al. | 370/329 |
| 7,155,167 | B1 | 12/2006 | Carty | 455/67.11 |
| 8,488,530 | B2 | 7/2013 | Wu et al. | 370/329 |
| 2002/0152303 | A1* | 10/2002 | Dispense | H04L 41/5009 709/224 |
| 2002/0193119 | A1* | 12/2002 | Goss | H04W 76/18 455/453 |
| 2006/0160542 | A1* | 7/2006 | Salmenkaita | H04W 72/082 455/450 |
| 2006/0233111 | A1* | 10/2006 | Wright | H04B 17/0087 370/241 |
| 2008/0070509 | A1* | 3/2008 | Kish | H04B 1/0475 455/67.13 |
| 2008/0291823 | A1* | 11/2008 | Saltsidis | H04L 41/0677 370/216 |
| 2009/0235354 | A1 | 9/2009 | Gray et al. | 726/22 |
| 2010/0020707 | A1 | 1/2010 | Woodings | 370/252 |
| 2010/0246416 | A1 | 9/2010 | Sinha et al. | 370/250 |
| 2010/0260204 | A1* | 10/2010 | Pepper | H04L 43/106 370/474 |
| 2015/0222507 | A1 | 8/2015 | Choy et al. | 370/252 |

FOREIGN PATENT DOCUMENTS

| | | |
|---|---|---|
| WO | WO03061318 A1 | 7/2003 |
| WO | WO2004051868 A2 | 6/2004 |

OTHER PUBLICATIONS

The English translation of the International Preliminary Report on Patentability (Chapter I of the Patent Cooperation Treaty), dated Aug. 28, 2018, which was issued by the International Bureau of WIPO in Applicant's corresponding International PCT application having Serial No. PCT/EP2017/053746, filed on Feb. 20, 2017.

The Written Opinion of the International Searching Authority, in English, dated May 4, 2017, which was issued by the International Bureau of WIPO in Applicant's corresponding international PCT application having Serial No. PCT/EP2017/053746, filed on Feb. 20, 2017.

The International Search Report, in English, dated May 4, 2017, which was issued by the International Bureau of WIPO in Applicant's corresponding international PCT application having Serial No. PCT/EP2017/053746, filed on Feb. 20, 2017.

* cited by examiner

SYSTEM FOR MONITORING, CONTROLLING, ANALYZING PERFORMANCE AND/OR TRACING MALFUNCTIONS IN WLANS

The invention relates to a system for monitoring, controlling, analyzing performance and/or tracing malfunctions in standard radio networks using the recording of the data exchange of a minimum number of channels available in each radio network, wherein at least the channel utilization and/or the number of channel changes and/or the number of clients and/or the number of packet retransmissions is analyzed relative to the data exchange, according to claim 1.

The transmission of data by means of radio networks, in particular plants and systems based on automation technology, is increasingly popular. The increasing number of users and growing requirements as to the bandwidth and the response and transmission times, and especially the increasing relevance for business processes, result in considerable requirements as to the quality and the readiness of performance of the respective radio network. This means that during the introduction of radio networks as well as in the subsequent radio network operation, permanent control is appropriate at least in critical positions.

In doing so, application scenarios as well as user groups must be taken into account. Furthermore, a radio network controlling system must be capable of checking requirements in later operation, which are to be met by the system with respect to radio frequency and protocol technologies.

Hardware manufacturers provide so-called monitoring systems for many wireless technologies.

It is true that known solutions for monitoring IEEE 802.22 networks allow received data to be visualized and analyzed on a large scale, however, the possibilities of the hardware used (WLAN access points) are limited. The access points normally have one to two radio interfaces and either need to scan the relevant channels or can record data only on the set channel. Moreover, they must be wired and supplied with energy, which is expensive and restricts the flexibility of such a solution.

Though specialized monitoring systems from independent manufacturers, which are not based on WLAN access points, have the possibility of recording a plurality of channels, they are expensive and can be utilized to the full extent only in conjunction with special software.

In contrast to wired communication via field busses or Ethernet networks, the same medium is occupied by various technologies and users in radio communication. Moreover, the behavior of network nodes is very dynamic due to movement and extraneous influences. Sporadic, rare and hardly traceable faults are a typical case for radio networks. Due to a relatively low emission power of the devices, in most of the cases the analysis may only be performed in the close vicinity of the affected devices and at great expenditure.

Known client-based systems either scan via a plurality of channels and are thereby subject to data loss or capture only few channels and thus cannot record all relevant events. In infrastructure-based systems, access to the network management is required, which is not desired or possible in many cases. In addition, in larger networks, the network management becomes rapidly overstrained by the amount of data resulting from the monitoring tasks.

WO 2003/061318 A1, for example, shows a method for minimizing disturbances within a frame of a radio network, the radio network consisting of a plurality of cells, subscribers and base stations which exchange information in allocated time slots.

DE 43 03 999 A1 assumes special lists of channels to be drawn up in a radio network planning phase. In case of changes to the radio network, which occur in operation, this document discloses to modify the allocation of the radio channels from measurement data obtained while the mobile radio system is in operation, whereby a certain adaptive design of that system is possible.

In DE 10 2006 044 462 B4, information is exchanged between the access points and the subscribers for the purpose of optimizing the channel assignment.

A method for reducing disturbances in a network is already known from U.S. Pat. No. 5,933,420, wherein the network includes a plurality of channels and a plurality of access points. There is a communication between the access points and the channels. By analyzing this communication, a channel assignment is realized that allows a more undisturbed data exchange. A dynamic channel allocation is also explained in U.S. Pat. No. 6,977,912 B1.

From the aforementioned, it is therefore a task of the invention to create a system by means of which on-site monitoring, controlling, analyzing performance and/or tracing malfunctions in standard radio networks using the recording of the data exchange of a minimum number of channels available in the respective radio network is possible. In doing so, the respective user of a radio network should be able, in particular in an industrial environment and on-site, to monitor the radio communication in a loss-free manner and continuously even over a longer period of time, that is for long-term analysis, so as to then determine, after a significant monitoring period, which quality the available network has with respect to its communication properties, and whether there are still radio network resources left. The inventive system should thus enable support to the users for the interference suppression of their radio systems and should in this respect reach beyond the limitations of previous facilities.

Furthermore, the system should allow the radio communication to be called up and analyzed in case of failure, even when a malfunction occurs only very sporadically and is notified days or weeks later.

The solution of the task is realized by a system for monitoring, controlling, analyzing performance and/or tracing malfunctions in standard radio networks according to the feature combination according to claim 1, with the dependent claims comprising at least appropriate configurations and further developments or utilizations.

The basic idea in the inventive system accordingly is to enable long-term analyses for determining long-term statistics and capturing sporadic malfunctions. Hereby, an early detection of bottlenecks in the respective network is possible, on the one hand, as well as troubleshooting is improved. Thereby, a protocol analysis of all relevant WLAN channels is performed in a loss-free manner. In addition, a real-time spectrum analysis is performed in time synchronicity with the protocol analysis, and logging of identified radio subscribers or other facilities involved in the radio network is performed.

The system is capable of loading its own software for traffic analysis and carrying out a visualization by means of a webserver. If required, a "live" analysis may be performed via remote desktop or download of relevant trace slices.

The system is preferably formed as a mobile, portable unit and may in this respect be accommodated in a stand-alone housing and protected from weather exposure, so as to allow the data traffic to be permanently recorded on site at the customer's premises. In a further development of the invention, the portable unit may have an integrated, self-sufficient power supply.

If required, there is the option of providing a remote access to the system. A plurality of inventive systems including a mobile, portable unit may be placed, for example, in various locations in an industrial environment and used for a distributed controlling, with the individual systems being able to mutually communicate and exchange data.

The inventive system accordingly is formed as a mobile, portable unit comprising a plurality of radio frequency receivers covering all available radio channels or the channels identified by the system as relevant.

The receivers are in this respect equipped with antennas which are optimized for relevant frequency ranges.

The receivers may be of a passive configuration but may also be of an active design. In case of an active design, the receivers have low-noise amplifiers (LNAs) and optionally band pass filters, for example, in the range of 2.4 to 2.5 GHz, 5.1 to 5.9 GHz etc., depending on the relevant frequency band.

The unit furthermore comprises at least one adapter, which processes the radio frequency signals, i.e. prepares the data or data packets recorded by the radio frequency receivers and transfers them in the form of traffic data to a mass memory of an integrated computer or processor.

The recorded, stored traffic data undergoes a statistical analysis according to predefinable characteristic values. The results of the analysis are filed with a high temporal resolution in an intrasystem database or system-inherent database, wherein, if anomalies are detected, the data communication or the traffic data around the time of the anomaly is retrieved and made available for further analysis.

In a further development of the invention, the system may be operated in a dynamic, static or also a control mode.

In the dynamic mode, after relevant radio network channels have been identified and the system has been booted, a scanning of the air interface is performed and it is checked by means of a WLAN adapter, if and which changes have been made in the channels used, so as to adapt the channel selection and the setting thereof.

In the static mode, in principle, all of the channels present in the radio network to be controlled are recorded.

In the control mode, the recording of the traffic is realized on the basis of a predefined list of access points or clients along with their prioritization.

The predefinable characteristic values comprise, for example, infrastructure statistics such as the utilization of the radio channels, occurred channel changes, number of clients per access point, number of simultaneously active clients or similar. Moreover, the characteristic values may contain client statistics divided according to uplink and downlink, and to be more precise, the occupancy of the radio channels by each individual client, the percentage number of packet retransmission at the clients, the evaluation of the management traffic per client, and similar.

These characteristic values may be determined in a freely definable temporal resolution (e.g. for each second) and stored in a database so that these can be retrieved very rapidly and at any time for visualization or derivation of further characteristic values. The derived characteristic values may be made available in the form of freely definable reports at regular intervals. If in this case an anomaly is detected, the relevant trace slice may be processed by the system and provided for downloading.

In an embodiment of the invention, for all or selected clients, errors derived from empirical values, i.e. so-called traps are logged. These include, for instance, the interruption of the communication, the shifting of access points (roaming), repeated roaming within a predefined interval of time, unsuccessful roaming, anomalies in transferring defined test traffic and similar.

In an embodiment of the invention, customer-specific information may be imported into the database. This may include, for example, MAC addresses, names, and other associated information of relevant access points and clients, as well as logging statistics of further controlling systems such as WLAN controllers, logging of the plants, the terminals or special applications.

Long-term statistics may be set up by means of the inventive system based on which a trend analysis is performed and a prediction on potential future bottlenecks or problematic cases may be made.

In a further development of the invention, the system is connected to a real-time capable spectrum analyzer so as to determine and record a spectrum progress for a predefined period of time or on the basis of events.

One or more receiver units offer the option of identifying extraneous radio systems and the interfering influences thereof, providing them with a time stamp and transferring them into the database.

The system also allows for radio network anomalies to be analyzed when transferring test traffic defined in advance.

Furthermore, the use of the system for qualifying radio networks and radio network locations both from the radio network user's and the radio network operator's perspective is also according to the invention.

The invention will be explained below in greater detail on the basis of an exemplary embodiment and referring to Figures.

Figure 2:
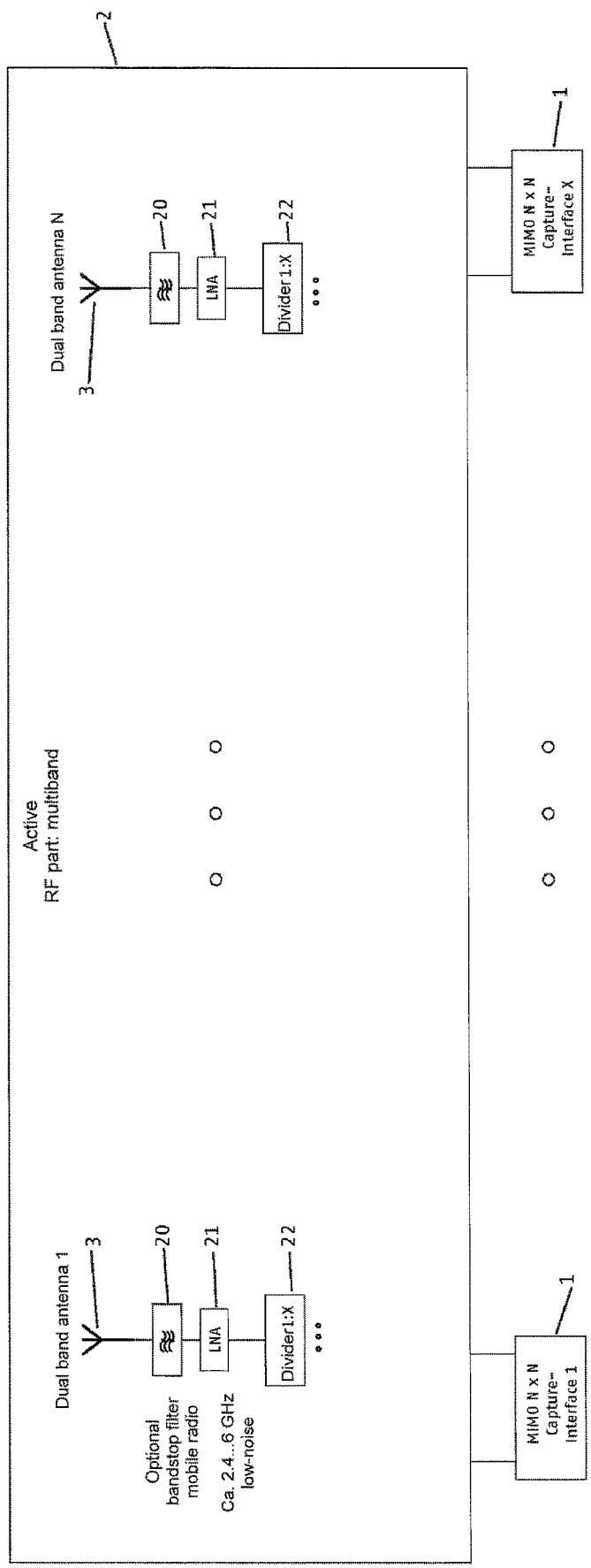
Figure 3:
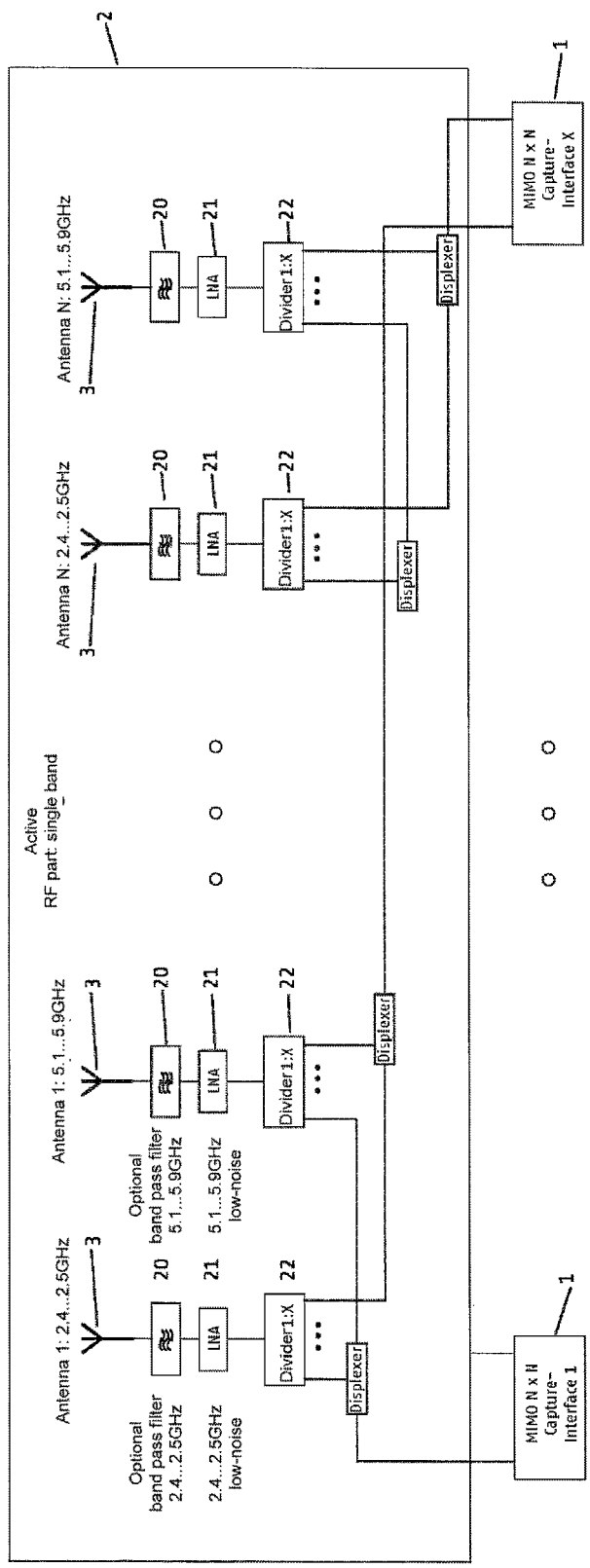

Shown are in:

FIG. 1 a block diagram of the system according to the invention for monitoring, controlling, analyzing performance and/or tracing malfunctions in standard radio networks;

FIG. 2 a further development of the radio frequency part from FIG. 1, here in the form of an active RF multiband part; and FIG. 3 a further development of the active RF part in single band design having corresponding band pass filters, for instance for the ranges of 2.4 to 2.5 GHz and 5.1 to 5.9 GHz.

The inventive solution according to the exemplary embodiment, for example, is aimed at WLAN (IEEE 802.11) but is in principle applicable to other radio standards as well.

The inventive system has a number of receivers covering all available radio channels or the radio channels identified by the system as relevant.

The receivers are adjusted to the channels, which may be performed by the user or else automatically and adaptively by the system. The system records the entire radio traffic on the channels in a loss-free manner. The recorded data packets are stored completely or with the usable contents (packet payload) adapted for data protection reasons. The system allows a long-term analysis with sufficient computing power and storage space and is equipped accordingly.

The following modes may be predefined by the user or by a configuration file.

In the dynamic mode, the system boots up, identifies automatically relevant channels and attunes the recording system to these channels. Subsequently, another WLAN adapter scans the air interface and identifies which changes have been made in the used channels. Subsequently, the setting of the channels to be recorded is dynamically adapted.

In the control mode, a list of access points or clients is predefined which is relevant for the analysis. In doing so, the defined devices may be prioritized. The results of the scanning procedure are analyzed in this case according to the predefined list and weighted. Using the results, the channel settings of the WLAN adapters are correspondingly adapted.

In the static mode, the recording system is configured such that all of the channels available in the WLAN to be controlled are recorded. For this purpose, the system is equipped with a required number of receivers.

These configuration options allow the traffic to be recorded in a loss-free manner, with the necessary hardware resources being accessed. The system may be time-synchronized with all available controlling systems, for instance via the so-called NTP protocol.

The recorded traces are statistically analyzed with predefined characteristic values, whereby long-term statistics of the radio communication are formed. All of the results are stored in a separate yet system-inherent database with a high temporal resolution, for instance every second.

Infrastructure statistics, for example, are part of the relevant characteristic values. This means, for instance, the occupancy of the radio channel, both the value signaled by the infrastructure in the management packets and the actual values calculated at the location of the monitoring system, the number of occurred channel changes, the number of clients per access point, the number of simultaneously active clients or similar.

Client statistics, divided according to uplink and downlink, also serve as characteristic values, and especially with respect to the occupancy of the radio channel by each individual client, the percentage share of packet retransmissions at the clients, the assessment of the management traffic per client, etc.

Furthermore, traps derived on the basis of empirical values are logged. These include, for example, the interruption of the communication, the shifting of access points (roaming), repeated roaming within a predefined interval of time, unsuccessful roaming, anomalies in transferring defined test traffic and similar.

The traps either may be maintained for all clients or restricted on the basis of the list of relevant devices. The traps, statistics and anomalies are weighted and displayed to the user in a simple, self-explanatory form. This may be visualized, for instance in traffic light colors, with green being representative for okay, yellow for warning and red for alarm.

Furthermore, the database allows customer-specific information to be imported such as, for example, MAC addresses, names and associated information of relevant access points and clients, as well as logging statistics from other controlling systems.

Due to the loss-free recording, the high temporal resolution of the statistics, and the simple, freely scalable representation, a navigation of the entire recording period is enabled.

If an anomaly is detected in this navigation, the data traffic around the relevant point in time may be retrieved very rapidly and analyzed and observed in detail.

This data traffic is supplied to the user as an expediently filtered trace which can be assessed by expert personnel at low expenditure.

At the same time, this trace may be prepared more extensively for decoding. As an alternative, the useful data of the packets may also be deliberately cut off for data protection reasons.

Furthermore, a management report on the status of the controlled range according to settable criteria may be established on the basis of the statistics.

Further, there is the option of extracting or combining single contents of the database that have been classified as relevant in a correspondingly compressed manner. Long-term statistics (24/7 for several months) can thus be established.

Based on these statistics, trends can be derived by means of which a prediction of possible bottlenecks or potential problems can be established in terms of malfunction prevention.

The database is filed on the same fixedly installed or exchangeable data medium so that this data medium can be analyzed in each computer controlled locally or remotely via the local network, mobile radio access or similar by a corresponding visualization system.

A further feature of the inventive system is the real time triggering.

It is based on events which are triggered in the following way.

Via the protocol analysis of the described monitoring system, of an external time-synchronous logging system, events in the radio channel which are recorded by a real-time capable spectrum analyzer or similar. Via this trigger, data which is held for a settable period of time, is stored. At the same time, status messages may be sent to a defined group of persons. This enables a prompt notification on relevant events and—if necessary—a prompt intervention by the operator of the network.

Further, a control of the real-time capable spectrum analyzer is possible. On the basis of a settable event, for instance a radar message of an access point, a message about a malfunction or a loss of the connection to a production plant, etc., the spectrum profile recorded in the relevant interval of time is stored for later analysis. Extraneous radio systems and disturbance influences detected by a separate sensor are filed together with a time stamp for later import into the frequency management database.

In one embodiment, the system is battery-operated and accommodated in a correspondingly robust housing and may accompany a concerned client, for instance by riding on a forklift, a driverless transport system or another vehicle and may permanently record and analyze the communication thereof.

If needed, the system may be remotely controlled at any time, for instance via mobile communications or WLAN, for "live" analysis.

The inventive monitoring system is flexibly expandable. The support of novel radio standards may be implemented at any time in short term by exchanging employed receivers. Further analysis functions and more detailed statistics may likewise be integrated.

Further, smaller systems may be connected for covering larger areas, so that an adaptation to different conditions of use and environment becomes possible in order to achieve maximum coverage in the radio network. The analysis and the access to all subsystems in this case is still performed for the user via a central access point.

FIG. 1 shows a block diagram of the system for monitoring, controlling, analyzing performance and/or tracing malfunctions in standard radio networks. The system is implemented as a mobile portable unit.

The system comprises a plurality of RF receivers 1 realized as MIMO units N×N, also referred to as a Capture-Interface 1 to X.

Each RF receiver 1 is in communication with a radio frequency part 2.

The passive radio frequency part 2 shown in FIG. 1 features a number of antennas 3 from 1.1 to 1.n and X.1 to X.n, respectively.

The antennas are preferably realized as dual band antennas.

The respective Capture-Interface 1 to X leads in each case to an input of an adapter 4.

The respective adapter 4 establishes a connection to the main-board of a computer 5.

The computer or processor moreover has the usual components such as a power supply 6, inputs and outputs 7, a fan unit 8, a power distribution 9, a CPU 10, a main memory 11 and at least one further interface 12.

At the inputs and outputs 7, for example, an HDMI terminal 13, a USB terminal 14 and a LAN terminal 15 are available. A connection to the electricity grid 16 is established via a corresponding input.

The recorded, stored traffic data undergoes a statistical analysis according to predefined or predefinable characteristic values. The results of the analysis are filed with a high, freely definable temporal resolution in a database of a mass memory 17. The mass memory may be implemented to be exchangeable or replaceable via appropriate means.

Optionally, a customer network link or a link to external monitoring systems 18 may be achieved via the interface 12. A real time spectrum analyzer 20 may be connected via a switch 19. Communication and control in this respect is possible via a mobile radio modem 21.

For detecting malfunctions, a corresponding further receiver system 22 may be realized.

As already explained, the radio frequency part 2 is formed to be passive in the representation as per FIG. 1.

According to the embodiment according to FIG. 2, however, an active multiband radio frequency part may likewise be realized. In this case, dual band antennas 3 are used which lead via an optional band pass filter 20 via a low-noise amplifier 21 to a corresponding divider 22 whose output is connected to the respective Capture-Interface 1.

In the representation according to FIG. 3, specific antennas are used for each frequency range, for example, 2.4 to 2.5 GHz or 5.1 to 5.9 GHz, wherein in this embodiment as well each antenna is coupled to a frequency-selective low-noise amplifier via an optional band pass filter with regard to the respective frequency range.

The outputs of the amplifiers 21 in turn are coupled to corresponding dividers 22 which in turn lead to the respective Capture-Interface 1.

The component groups, with the exception of the radio frequency part and the merely optional further development including the real time analyzer 20 and mobile radio modem 21, may be accommodated in a portable compact housing that is protected against environmental influences, wherein the corresponding radio frequency part 2 may then be connected via terminals that are correspondingly accessible from outside. Due to the option of the external control or also the monitoring process that can be automated, an intervention on-site at or in the device is not necessary so that the corresponding system can be employed without disturbing the user or attracting his or her attention.

In one realized embodiment, the system can realize WLAN monitoring of up to sixteen channels with 3×3 MIMO in a loss-free manner in terms of a loss-free long-term data recording and, as required, "live" analysis via remote desktop or download of relevant trace slices.

The invention claimed is:

1. A system for monitoring, controlling, analyzing performance and tracing malfunctions in standard radio networks using the recording of the data exchange of a minimum number of channels available in each radio network, wherein at least one of the channel utilization and the number of channel changes and the number of clients and the number of packet retransmissions is analyzed relative to the data exchange, characterized in that the system is formed as a mobile, portable unit comprising a plurality of radio frequency receivers covering all available radio channels or the channels identified by the system as relevant, the mobile, portable unit further comprises at least one adapter, which prepares the data and data packets recorded by the radio frequency receivers and transfers them in the form of traffic data to a mass memory of an integrated computer or processor, the recorded, stored traffic data undergoes a statistical analysis according to predefinable characteristic values and the results of the analysis are filed with a high temporal resolution in an intrasystem database, wherein when anomalies are detected, the data communication or the traffic data around the time of the anomaly is retrieved and made available for further analysis, wherein said system may be operated in a dynamic, static or control mode, wherein in the dynamic mode, a WLAN adapter scans the air interface and checks when and which changes have been made in the employed channels, so as to adapt the channel selection and the setting thereof;

in the static mode, in principle, all of the channels present in the radio network to be controlled are recorded; and in the control mode, the recording of the traffic is realized on the basis of a predefined list of access point or clients along with their prioritization; and wherein, for all or selected clients, errors or traps derived from empirical values are logged, which include, for instance, the interruption of the communication, roaming, repeated roaming within a predefined interval of time, unsuccessful roaming as well as anomalies in transferring a defined test traffic.

2. The system according to claim 1, characterized in that the characteristic values comprise at least:

utilization of the radio channel, occurred channel changes, number of clients per access point, number of simultaneously active clients, occupancy of the radio channel by each individual client, percentage number of packet retransmission at the clients, evaluation of the management traffic per client.

3. The system according to claim 1, characterized in that customer-specific information may be imported into the database.

4. The system according to claim 1, characterized in that long-term statistics may be set up based on which a trend analysis is performed so as to make a prediction on potential future bottlenecks or problematic cases.

5. The system according to claim 1, characterized in that said system is connected to a real-time capable spectrum analyzer so as to determine and record a spectrum progress for a predefined period of time or on the basis of events.

6. The system according to claim 1, characterized in that
a separate receiver unit is provided which identifies extraneous radio systems and the interfering influences thereof and transfers them into the database with an applied time stamp.

7. The system according to claim 1, characterized in that
the radio frequency receivers feature a band pass filter and a pre-amplifier.

8. The system according to claim 1, characterized in that
an analysis of radio network anomalies may be performed when transferring a test traffic defined in advance.

9. The system according to claim 1, characterized by
the use thereof for qualifying radio networks and radio network locations both from the radio network user's and the radio network operator's perspective.

* * * * *